United States Patent [19]

Stevens et al.

[11] Patent Number: 5,104,550

[45] Date of Patent: Apr. 14, 1992

[54] OXIDATION AND PHOTOOXIDATION PROCESS

[75] Inventors: R. D. Samuel Stevens, Thornhill; Stephen R. Cater, Willowdale, both of Canada

[73] Assignee: Solarchem Enterprises Inc., Richmond Hill, Canada

[21] Appl. No.: 492,155

[22] Filed: Mar. 13, 1990

Related U.S. Application Data

[62] Division of Ser. No. 234,044, Aug. 19, 1988, Pat. No. 4,956,098.

[51] Int. Cl.$^5$ ............................................. C02F 1/32
[52] U.S. Cl. ............................... 210/721; 210/724; 210/748; 210/759; 210/760; 210/908; 210/909
[58] Field of Search ........ 210/721, 724, 748, 758–760, 210/908, 909

[56] References Cited

U.S. PATENT DOCUMENTS

| | | | |
|---|---|---|---|
| 1,980,896 | 11/1934 | Windecker | 210/721 |
| 3,448,045 | 6/1969 | Hess et al. | 210/760 |
| 3,901,804 | 8/1975 | Ohuchi et al. | 210/721 |
| 3,931,007 | 1/1976 | Sugano | 210/721 |
| 3,997,439 | 12/1976 | Ayukawa | 210/721 |
| 4,274,969 | 6/1981 | Lecoq et al. | 210/721 |
| 4,301,014 | 11/1981 | Buckholtz et al. | 210/721 |
| 4,332,687 | 6/1982 | Daignault et al. | 210/721 |
| 4,347,141 | 8/1982 | Rothberg | 210/721 |
| 4,623,465 | 11/1986 | Klibanov | 210/721 |
| 4,631,132 | 12/1986 | Jones | 210/727 |
| 4,642,134 | 2/1987 | Van Antwerp et al. | 210/760 |
| 4,652,382 | 3/1987 | Edwards et al. | 210/760 |
| 4,683,065 | 7/1987 | Sheikh | 210/759 |
| 4,686,154 | 8/1987 | Zimberg | 210/748 |
| 4,729,835 | 3/1988 | McNeillie et al. | 210/759 |
| 4,741,833 | 3/1988 | Sheikh | 210/759 |
| 4,874,530 | 10/1989 | Kobayashi et al. | 210/721 |

Primary Examiner—Thomas Wyse
Attorney, Agent, or Firm—Bereskin & Parr

[57] ABSTRACT

An improved oxidation and photooxidation process for treating water containing an oxidizable contaminant. In one embodiment, the organic compound does not have an electron donating aromatic group. A stochiometric excess amount of a calcium salt is added to precipitate carbonate and bicarbonate ions contained in the water as calcium carbonate. The calcium carbonate is removed from the water and the filtered water is then subjected to an oxidation process. In another embodiment, the organic compound does have an electron donating aromatic group. Carbonate and/or bicarbonate is added so that the water has a stochiometric excess amount of carbonate and bicarbonate. The water is then subjected to an oxidation process.

15 Claims, 8 Drawing Sheets

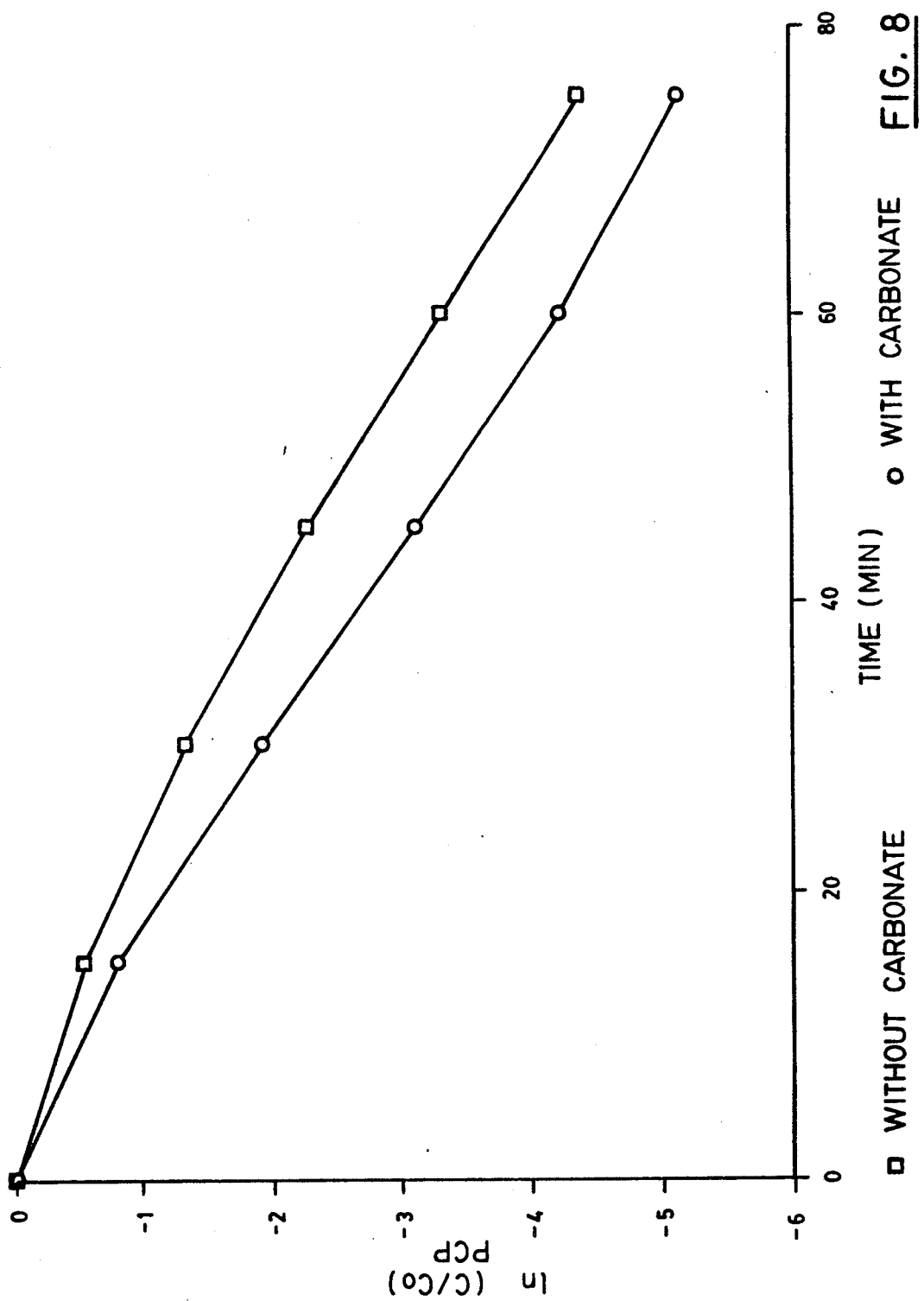

OXIDATION AND PHOTOOXIDATION PROCESS

This is a division of application Ser. No. 07/234,044 filed Aug. 19, 1988, U.S. Pat. No. 4,956,098.

FIELD OF THE INVENTION

This invention relates to an improved oxidation and/or photooxidation process for removing oxidizable contaminants from water by subjecting the water to a preliminary treatment step prior to the oxidation and/or photooxidation step. More particularly, in the case of organic compounds which include an aromatic group that is electron donating, carbonate is added to the water prior to the oxidation/photooxidation step. However, in the case of organic contaminants that do not include a substituent that is electron donating, a precipitation step is used to remove the carbonate in the water prior to the oxidation/photooxidation step.

BACKGROUND OF THE INVENTION

Contaminated water exists in ever increasing quantities. Some of these waters contain low levels of organic compounds such as 2,4-dinitrotoluene, 1,4-dioxane, ethylene glycol, trinitrotoluene, phenols, anilines and pentachlorophenol. These compounds are susceptible to oxidation and/or photooxidaton processes. By such reactions, these organic compounds can be oxidized to carbon dioxide and water and, in the case of nitro or chloro compounds, $NO_3^-$ and $Cl^-$.

Accordingly, when oxidizable compounds are present in relatively low concentrations, less than 10,000 ppm, the water may be treated by the addition of one or more oxidizing agents accompanied, in some instances, with irradiation. Oxidizing agents which result in the production of hydroxyl and hydroperoxy radicals are typically employed. These radicals are very strong oxidizing agents and, in addition, they indiscriminately oxidize all organic compounds. Typical sources of such oxidizing radicals are ozone and hydrogen peroxide. The irradiation is normally conducted by using ultraviolet light having a wave length of from about 200 to about 300 nm. The choice of oxidizing agent and the use of ultraviolet light will depend upon various factors including the concentration of oxidizable contaminants in the water stream, the required amount of oxidizing radical and the pH of the water.

The oxidation/photooxidation treatment may be conducted to any stage of completion which is required. If the only contaminants present in the water are oxidizable contaminants, the water may be treated so that it meets environmental requirements for use or disposal. Alternatively, the water may be recycled or, if other non-oxidizable contaminants are present, subjected to further treatment.

Typically, waters can be held in holding tanks prior to the oxidation/photooxidation treatment. In such cases, the water is exposed to carbon dioxide. As a result of this exposure, carbonate and bicarbonate ions are formed. These ions compete for the oxidizing hydroxyl radicals. As a result of this competition, the amount of oxidizing agents to be added to the solution may have to be increased if the treatment rate is not to be greatly diminished. However, if ozone is being used, then it may not be possible to increase the flow rate of ozone to the oxidation reaction without increasing the size of the ozone plant. There is therefore a need for an efficient method to control the competition for the oxidizing radicals by the carbonate and bicarbonate ions.

SUMMARY OF THE INVENTION

Carbonate and bicarbonate react with hydroxyl radicals and hence compete with the contaminants for the hydroxyl radicals. This reduces the efficiency of hydroxyl radical use and can significantly increase the reaction times and cost of destroying the contaminants. In order to reduce the effect of carbonate and bicarbonate, a precipitation step is added to eliminate carbonate and bicarbonate from the water prior to the oxidation and/or photooxidation treatment step. In some cases, the carbonate radical anion or bicarbonate radical, which are formed from reaction of the hydroxyl radical with carbonate and bicarbonate respectively, can react with the contaminant or contaminants but not with other benign co-constituents and lead to oxidation of that contaminant. In these cases it is preferable to add carbonate and/or bicarbonate to the water prior to the oxidation and/or photooxidation step so that the carbonate and/or bicarbonate react with the hydroxyl radicals to produce a carbonate radical anion and/or bicarbonate radical which can then selectively oxidize the contaminant.

In one embodiment of this invention, a process is provided whereby a precipitation agent is added to the water prior to the oxidation/photooxidation treatment. The precipitation agent combines with the carbonate and bicarbonate ions to form an insoluble compound which precipitates out of solution. With the removal of the carbonate and bicarbonate ions which compete for the oxidizing radicals, either the required amount of oxidative agent and/or the reaction time is reduced.

The oxidizable contaminants which may be treated by this process include organic compounds that do not have at least one electron donating aromatic group. Preferred compounds which may be treated by this process include 2,4-dinitrotoluene, trinitrotoluene, 1,4-dioxane and ethylene glycol.

The precipitation agent is selected so that it will combine with the carbonate and bicarbonate ions to form an insoluble composition. Further, the precipitation agent which is added should not contribute any other contaminant or impurity to the water which would require additional treatment steps to remove the additional impurity prior to the discharge of the water. Preferably, the precipitation agent is a water soluble calcium salt, and, more preferably, calcium hydroxide.

A sufficient amount of the precipitation agent must be added so that the carbonate and bicarbonate ions are precipitated out of solution. Further, an additional amount of the precipitation agent should be added so that the pH of the treated water is basic, preferably with a pH of at least 8 and, more preferably, with a pH of about 9. Accordingly, a stochiometric excess amount of the precipitation agent should be added.

After the addition of the precipitation agent, the water is then subjected to the oxidation/photooxidation process. In this step, an oxidizing agent is added to the water with or without irradiation. Preferably, the oxidation/photooxidation is conducted by using one of the following processes:

1. the addition of ozone and hydrogen peroxide
2. the addition of ozone and irradiation with ultraviolet light with a substantial component having a wavelength between about 200 and about 300 nm;

3. the addition of hydrogen peroxide and irradiation with ultraviolet light with a substantial component having a wavelength less than about 250 nm;
4. the addition of ozone where the water has a high pH; and,
5. the addition of ozone and hydrogen peroxide and irradiation with ultraviolet light with a substantial component having a wavelength between about 180 and 300 nm.

In another embodiment of this invention, a process is provided whereby carbonate and/or bicarbonate is added to the water prior to the oxidation/photooxidation treatment.

The oxidizable contaminants which may be treated by this process include aromatic compounds that have at least one electron donating aromatic group. Preferred compounds which may be treated by this process include organic compounds which have an aromatic group having a substituent selected from the group consisting of —OR and —NR$_1$R$_2$ wherein R, R$_1$ and R$_2$ are H or a hydrocarbon radical and wherein R, R$_1$ and R$_2$ are the same or different. Examples of such compounds are phenols and anilines and, in particular, pentachlorophenol.

The compounds treated in this embodiment react with the carbonate and bicarbonate to form a positively charged species. These positively charged species are highly susceptible to oxidation.

Carbonate and bicarbonate may be added to the water by the addition of a water soluble carbonate salt or a water soluble bicarbonate salt. Preferably, sodium carbonate, potassium carbonate or sodium bicarbonate are added. A sufficient amount of carbonate and/or bicarbonate is added so that the carbonate and bicarbonate may react with all of the oxidizable contaminant. Further, an additional amount of carbonate and/or bicarbonate is added so that the pH of the treated water is basic, preferably with a pH of at least 8 and, more preferably, with a pH of about 9. Accordingly, a sufficient amount of carbonate and/or bicarbonate is added so that there is a stochiometric excess amount of carbonate and bicarbonate over the oxidizable contaminants in the water prior to the oxidation/photooxidation reaction. The exact amount of carbonate or bicarbonate which must be added will depend, in part, upon the amount of carbonate and bicarbonate initially in the water.

After the addition of the carbonate, the water is then subjected to an oxidation/photooxidation process. The oxidation/photooxidation step may be selected from any of those set out earlier.

The water which is treated pursuant to these processes should have low concentrations of oxidizable contaminants. Preferably, the oxidizable contaminants are present in a concentration of less than 10,000 ppm and, more preferably, less than 1,000 ppm. While water containing higher amounts of oxidizable contaminants may be treated by this process, there are other processes which may then be utilized.

BRIEF DESCRIPTION OF THE DRAWINGS

For a better understanding of the present invention, reference will be made, by way of example, to the following drawings.

DESCRIPTION OF THE PREFERRED EMBODIMENT

Figure 1:
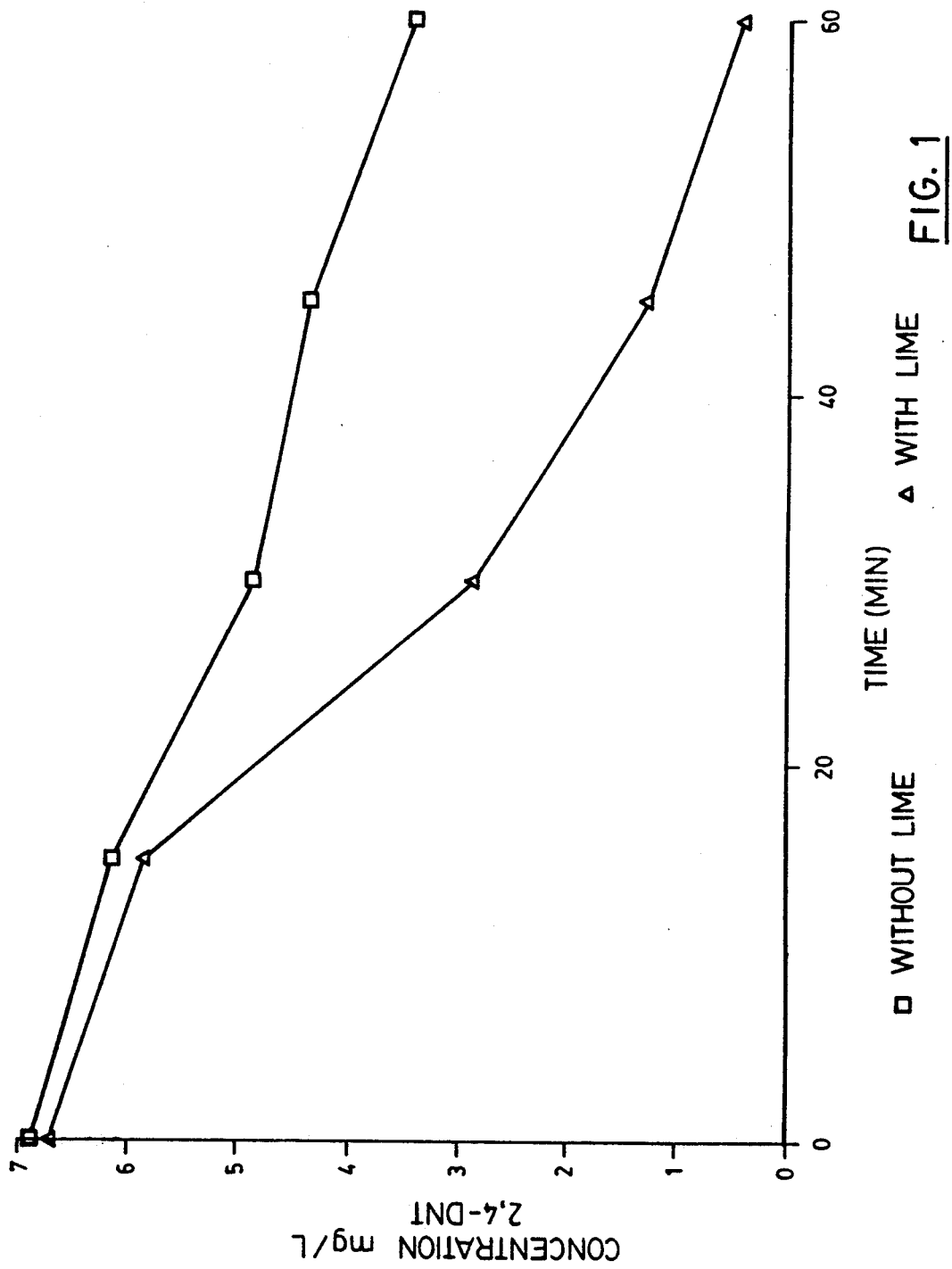
FIGS. 1 and 2 represent plots of concentration of 2,4-dinitrotoluene against time.

The aqueous stream which is treated pursuant to one embodiment of the improved oxidative/photooxidative process contains an oxidizable contaminant which does not have an electron donating aromatic group and at least one impurity selected from the group consisting of carbonate and bicarbonate ions.

Such an oxidizable contaminant may be any compound which is capable of being oxidized by the action of hydroxyl radicals to compounds which may be disposed of. Preferably, the oxidizable contaminants are one or more of 2,4-dinitrotoluene, trinitrotoluene, 1,4-dioxane and ethylene glycol. These compounds, when subjected to the oxidative action of hydroxyl radicals, react to form carbon dioxide and water and, if nitro or chloro compounds are present, NO$_3^-$ and Cl$^-$.

The oxidizable contaminants should be present in low concentrations. Preferably, the concentration of the oxidizable contaminants is less than 10,000 ppm and, more preferably, less than about 1,000 ppm.

The concentration of the carbonate and bicarbonate ions in the aqueous stream would vary depending upon the source of the stream and the time that the stream has been exposed to the atmosphere. The concentration of the carbonate and bicarbonate ions in the aqueous stream may be as high as 300 mg/l or higher.

The aqueous stream is first subjected to a precipitation step. At this stage, a stochiometric excess amount of a precipitation agent is added to the aqueous stream. The preferred precipitation agent is calcium hydroxide. Preferably, lime is added. When calcium hydroxide is added to an aqueous solution it dissociates to form calcium ions and hydroxyl ions. These ions react with carbonate and bicarbonate ions according to the equations set out below:

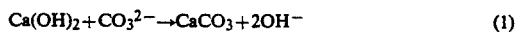

$$Ca(OH)_2 + CO_3^{2-} \rightarrow CaCO_3 + 2OH^- \qquad (1)$$

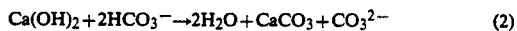

$$Ca(OH)_2 + 2HCO_3^- \rightarrow 2H_2O + CaCO_3 + CO_3^{2-} \qquad (2)$$

The calcium ions combine with the carbonate ions to form calcium carbonate. The solubility product of calcium carbonate in water is $4.8 \times 10^{-9}$. Accordingly, effectively all of the calcium carbonate would precipitate out of solution.

By excess stochiometric amount is meant a sufficient amount so that (1) there is a sufficient amount to react with the carbonate and bicarbonate ions and (2) the pH of the water after the precipitation step is basic. With respect to the first point, in the case of calcium carbonate, one mole of calcium hydroxide should be added for each mole of carbonate and bicarbonate ions which are present (see reactions (1) and (2) above). With respect to the second point, it is preferred that the pH of the treated water is at least 8 and, more preferably, the pH should be about 9. If, for example, the water contains a high level of carbonate and bicarbonate ions (300 mg/l), then approximately 400 mg/l of lime should be added.

Subsequent to the precipitation step, the calcium carbonate may be separated. This step is particularly preferred if the water contains high levels of carbonate and bicarbonate ions since a high level of precipitate may result in premature wear of the water pumps. Further, a high level of precipitate may result in a decrease in efficiency of the photooxidation step due to increased reflection of the ultraviolet light.

The filtered water is then subjected to an oxidative and/or photooxidative treatment step. The oxidative/photooxidative treatment which is used is preferably one of the following:

1. the addition of ozone and hydrogen peroxide
2. the addition of ozone and irradiation with ultraviolet light with a substantial component having a wavelength between about 200 and about 300 nm;
3. the addition of hydrogen peroxide and irradiation with ultraviolet light with a substantial component having a wavelength less than about 250 nm;
4. the addition of ozone where the water has a high pH; and,
5. the addition of ozone and hydrogen peroxide and irradiation with ultraviolet light with a substantial component having a wavelength between about 180 and 300 nm.

The use of one of the above treatments results in the production of hydroxyl radicals. These oxidizing radicals are indiscriminant in their oxidizing action and will oxidize virtually any available substance except fluoride ions. Accordingly, when the oxidizing contaminant is an organic compound, the organic compound is oxidized to carbon dioxide and water.

Due to the indiscriminant oxidizing action of the hydroxyl radicals, these radicals would react with carbonate and bicarbonate ions if they were present. The rate constant for the reaction of carbonate ions and the hydroxyl radicals is approximately $4 \times 10^8$ 1/mole.s Similarly, the rate constant for the reaction of bicarbonate ions and the hydroxyl radicals is about $1 \times 10^7$ 1/mole.s (Farhataziz et al, *Selected Specific Rates of Reactions of Transients from Water in Aqueous Solution*, U.S. Department of Commerce, issued January 1977). Accordingly, the carbonate and bicarbonate ions would compete for the oxidizing radical and interfere with the oxidation/photooxidation process. As a result of the precipitation of the carbonate and bicarbonate ions from the water, the reaction time is decreased and/or the amount of oxidizing agent which must be added is decreased.

By adding a precipitation stage to an existing treatment facility, the time to purify a given amount of water would be reduced and, accordingly, the amount of water which could actually be handled by the treatment facility would be correspondingly increased. In addition, in the case of a new plant which is being set up, the addition of such a precipitation step could result in a decreased demand for the oxidation agents. If one of the agents which is used is ozone, then a smaller ozone plant would be required, thus decreasing capital expenditures.

The aqueous stream which is treated pursuant to another embodiment of the improved oxidative/photooxidative process contains an oxidizable contaminant which has an electron donating aromatic group. Such an oxidizable contaminant may be any compound which is capable of being oxidized by the action of hydroxyl radicals. Preferably, the oxidizable contaminant is an organic compound having at least one aromatic group having at least one substituent selected from the group consisting of —OR and —NR$_1$R$_2$ wherein R, R$_1$ and R$_2$ are hydrogen or a hydrocarbon radical and wherein R, R$_1$ and R$_2$ are the same or different. Examples of such compounds include phenols and anilines. More preferably, the oxidizable contaminants include pentachlorophenol.

The oxidizable contaminants should be present in low concentrations. Preferably, the concentration of the oxidizable contaminants is less than 10,000 ppm and, more preferably, less than about 1,000 ppm.

Carbonate and/or bicarbonate is first added to the water. At this stage, a sufficient amount of carbonate and/or bicarbonate is added to the water so that there is a stochiometric excess amount of carbonate and/or bicarbonate to total oxidizable contaminants present in the water. The exact amount of carbonate and/or bicarbonate which must be added will depend upon the amount of carbonate or bicarbonate initially present in the water.

Preferably, carbonate is added to the water by the addition of a water soluble carbonate salt. Preferably, the water soluble carbonate salt is sodium carbonate or potassium carbonate. In the case of bicarbonate addition, preferably, a water soluble bicarbonate salt is added and, more preferably, sodium bicarbonate.

When a water soluble carbonate or bicarbonate salt is added to an aqueous solution, it disassociates to form carbonate and bicarbonate ions. These ions react with the hydroxyl radicals to form carbonate radical anions and bicarbonate radicals respectively, which then react with the oxidizable contaminants. The reactions are described in the equations set out below:

$$OH \cdot + CO_3^{2-} \rightarrow CO_3^- + OH^- \tag{3}$$

$$CO_3^- + X \rightarrow X^+ + CO_3^{2-} \tag{4}$$

$$OH \cdot + HCO_3^- \rightarrow HCO_3 \cdot + OH^- \tag{5}$$

$$HCO_3 \cdot + X \rightarrow X^+ + HCO_3^- \tag{6}$$

where x=oxidizable contaminant having an electron donating aromatic group.

The carbonate radical anion and bicarbonate ion combine with the oxidizable contaminant to form a possitively charged species and carbonate and bicarbonate ions. This positively charged species is very susceptible to further oxidation.

By excess stochiometric amount is meant a sufficient amount so that (1) there is a sufficient amount of carbonate and/or bicarbonate to react with the oxidizable contaminant and (2) the pH of the water prior to the oxidative/photooxidative reaction is basic. It is preferred that the pH of the treated water is at least 8 and, more preferably, the pH should be about 9.

Subsequent to the addition step, the water is subjected to an oxidative and/or photooxidative treatment step. The oxidative/photooxidative treatment step is preferably one of the five steps listed earlier.

The following non-limiting examples exemplify advantages of this process. In each of Examples 1, 2 and 3, three liters of solution were subjected to an oxidative reaction using hydrogen peroxide and ozone. Due to the rapid nature of the oxidative reaction when irradiation with ultraviolet light is used, the examples were conducted without irradiation to more easily show the benefits of the improved process. In each of Examples 1, 2 and 3, the oxidative treatment step was conducted both with and without the prior addition of lime.

EXAMPLE 1

Figure 2:
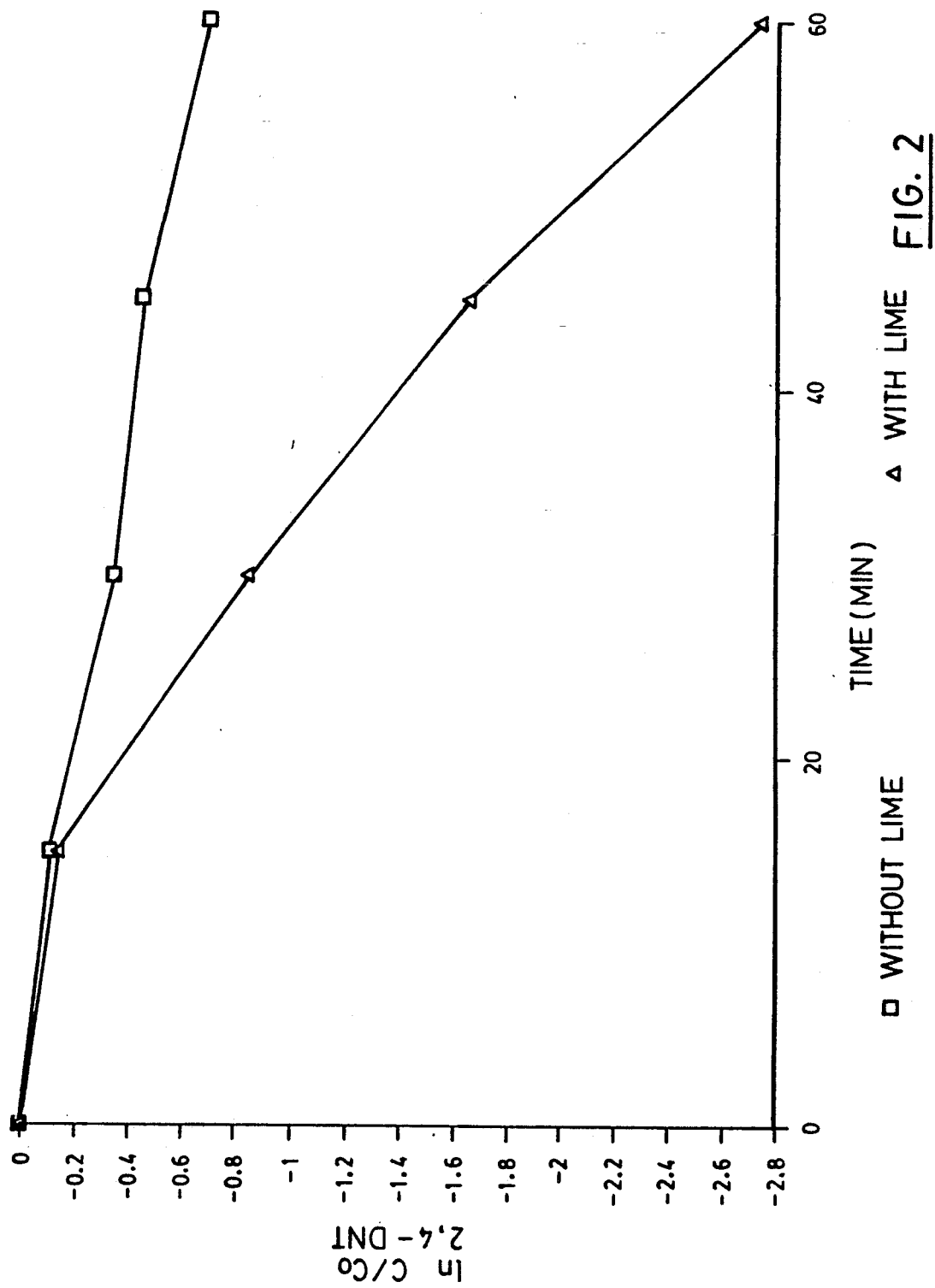

Three liters of industrial water containing 7 ppm of 2,4-dinitrotoluene and an estimated carbonate concentration of 500 mg/l was obtained. The pH of the water was 12. 1,000 mg/l of reagent grade lime was added. Subsequent to the precipitation of the calcium carbonate, the pH of the water was 12. 100 mg/l of hydrogen peroxide was added. Ozone in a concentration of 18 mg/l in air was bubbled through the solution at a rate of 0.35 liters of air per minute. The reaction was allowed to run for 90 minutes with samples of the solution being withdrawn every 15 minutes. The Example was repeated without the addition of lime. The reaction was allowed to run for 60 minutes. The results are set out in Table 1 below. These results are ploted on the graph shown in FIGS. 1 and 2.

TABLE 1

| Time (min) | With Lime Concentration (ppm) | $\ln\left(\frac{C}{Co}\right)$ | Without Lime Concentration (ppm) | $\ln\left(\frac{C}{Co}\right)$ |
|---|---|---|---|---|
| 0 | 6.73 | 0 | 6.88 | 0 |
| 15 | 5.84 | −0.142 | 6.13 | −0.115 |
| 30 | 2.88 | −0.849 | 4.85 | −0.350 |
| 45 | 1.29 | −1.65 | 4.37 | −0.454 |
| 60 | 0.44 | −2.73 | 3.45 | −0.690 |
| 75 | 0.10 | −4.21 | | |
| 90 | 0 | — | | |

Without the addition of lime, after 60 minutes, the concentration of 2,4-dinitrotoluene was 3.45 ppm. However, when the water was treated with lime, the concentration of 2,4-dinitrotoluene after 30 minutes was 2.88. This represents a greater then twofold improvement in the reaction time.

EXAMPLE 2

Figure 3:
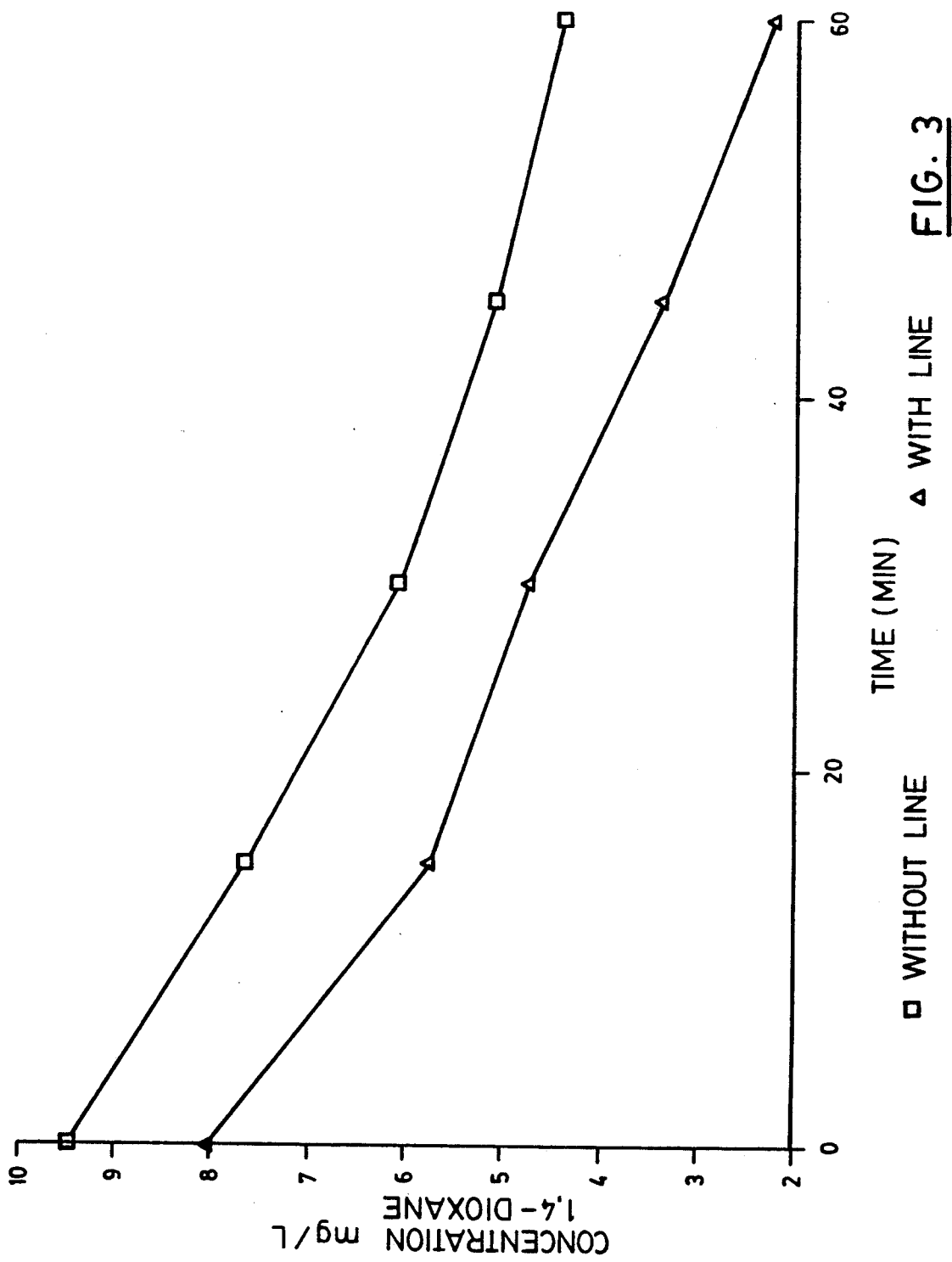
FIGS. 3 and 4 represent plots of concentration of 1,4-dioxane against time.
Figure 4:
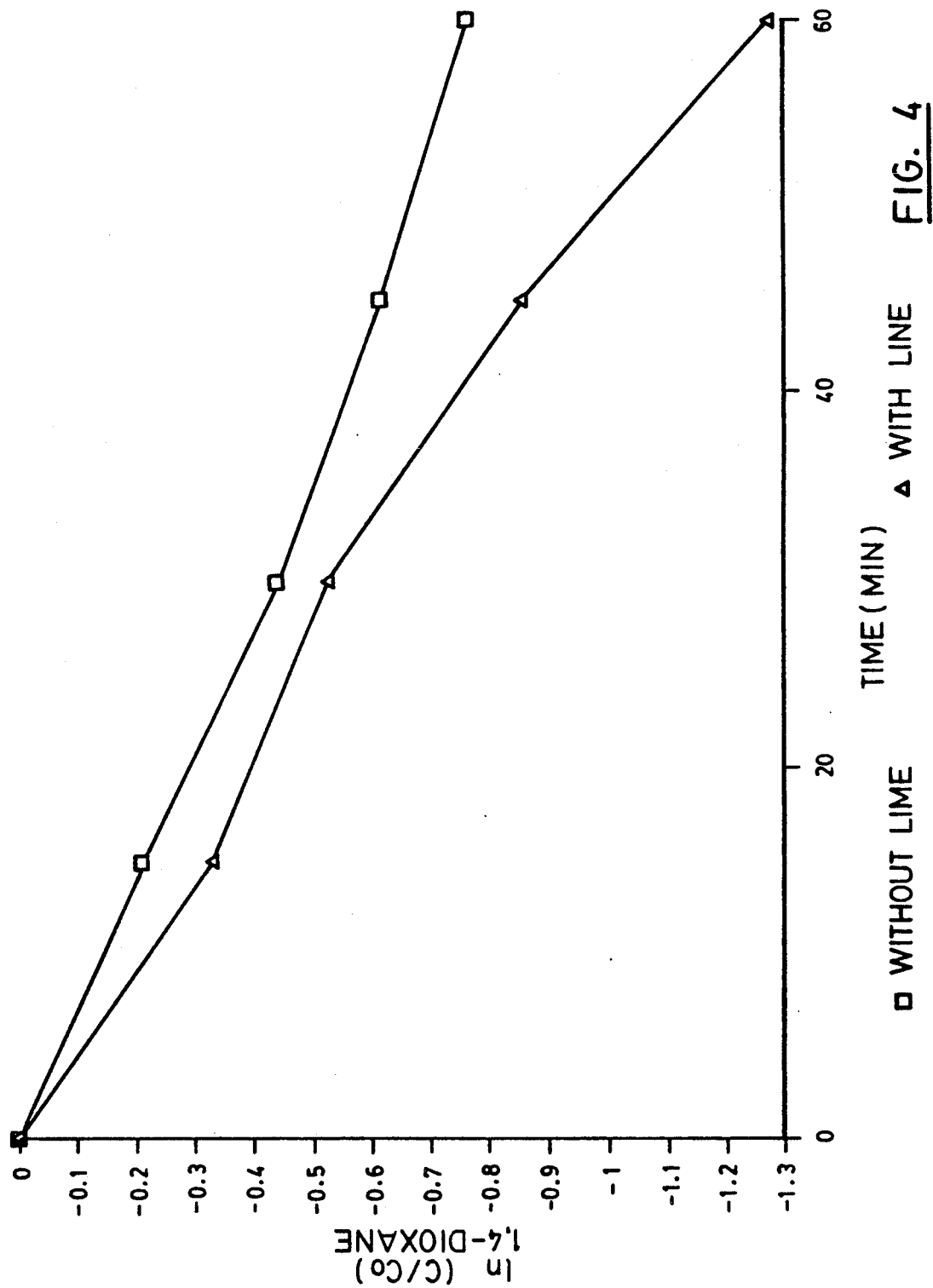

Three liters of water containing 10 ppm of 1,4-dioxane and 300 mg/l of $Na_2CO_3$ was prepared. The pH of the solution was 9. 400 mg/l of reagent grade lime was added. The final pH of the solution was 9. 10 ppm of hydrogen peroxide was added and ozone in a concentration of 18 mg/l in air was bubbled through at a rate of 0.35 liters of air per minute. The reaction was repeated without the addition of lime. The results are contained in Table 2 and plotted in FIGS. 3 and 4.

TABLE 2

| Time (min) | With Lime Concentration (ppm) | $\ln\left(\frac{C}{Co}\right)$ | Without Lime Concentration (ppm) | $\ln\left(\frac{C}{Co}\right)$ |
|---|---|---|---|---|
| 0 | 8.03 | 0 | 9.48 | 0 |
| 15 | 5.77 | −0.331 | 7.63 | −0.217 |
| 30 | 4.74 | −0.527 | 6.07 | −0.446 |
| 45 | 3.41 | −0.856 | 5.11 | −0.618 |
| 60 | 2.26 | −1.27 | 4.41 | −0.765 |

Once again, these results demonstrate that an increase in the reaction time of more than twofold was obtaind.

EXAMPLE 3

Figure 5:
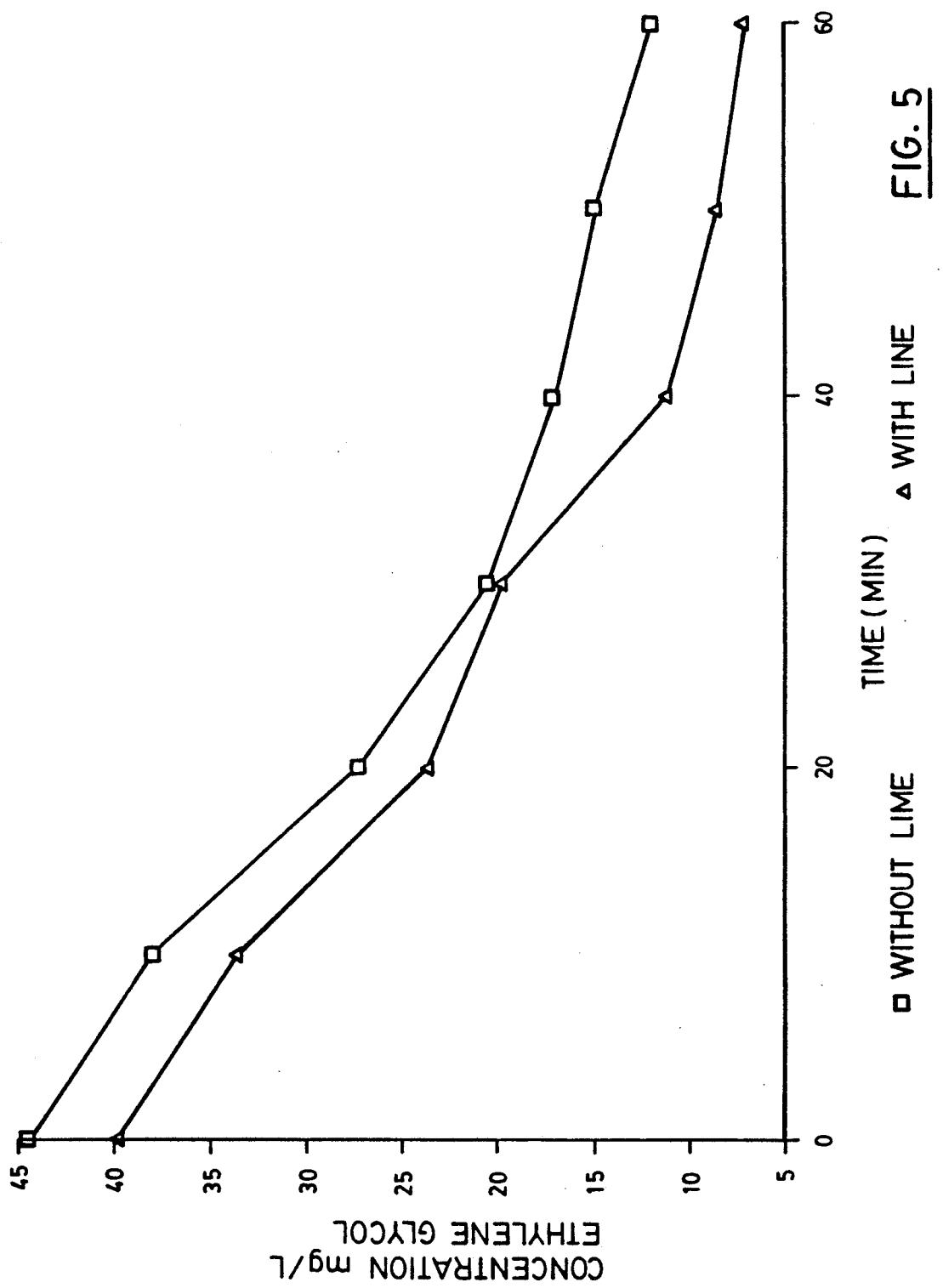
FIGS. 5 and 6 represent plots of concentration of ethylene glycol against time; and, FIGS. 7 and 8 represent plots of concentration of pentachlorophenol against time.
Figure 6:
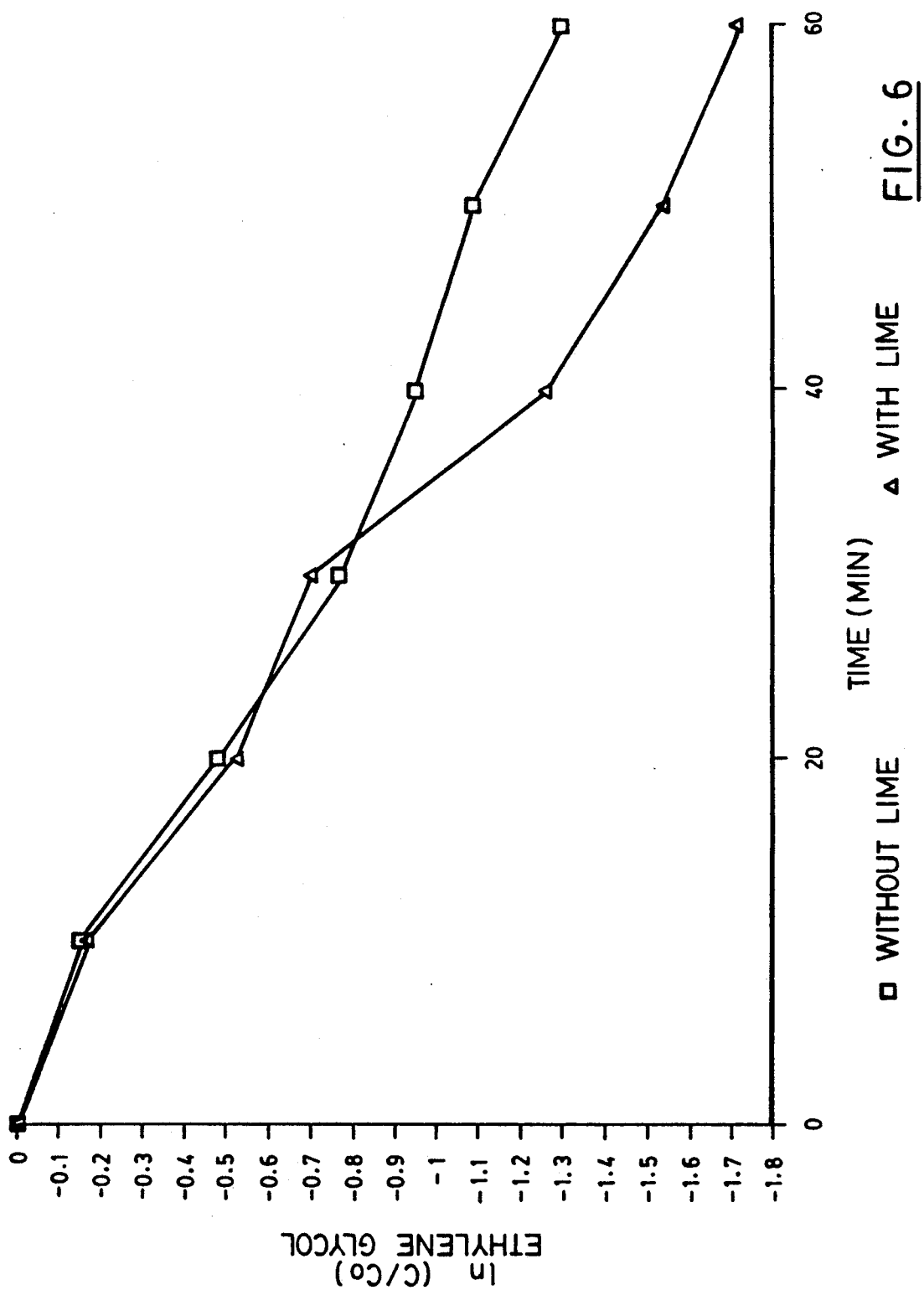

Three liters of solution containing 50 ppm of ethylene glycol and 300 mg/l of $Na_2CO_3$ was prepared. The pH of the solution was 9. The procedure as set out in Example 2 was followed with the exception that 25 mg/l of hydrogen peroxide was added. The pH of the solution after the addition of lime was 9. The results are set out in Table 3 and shown in FIGS. 5 and 6.

TABLE 3

| Time (min) | With Lime Concentration (ppm) | $\ln\left(\frac{C}{Co}\right)$ | Without Lime Concentration (ppm) | $\ln\left(\frac{C}{Co}\right)$ |
|---|---|---|---|---|
| 0 | 39.92 | 0 | 44.45 | 0 |
| 10 | 33.71 | −0.169 | 37.96 | −0.158 |
| 20 | 23.69 | −0.522 | 27.30 | −0.487 |
| 30 | 19.84 | −0.699 | 20.57 | −0.771 |
| 40 | 11.31 | −1.26 | 17.16 | −0.952 |
| 50 | 8.68 | −1.53 | 14.97 | −1.09 |
| 60 | 7.14 | −1.72 | 12.06 | −1.30 |

EXAMPLE 4

Figure 7:
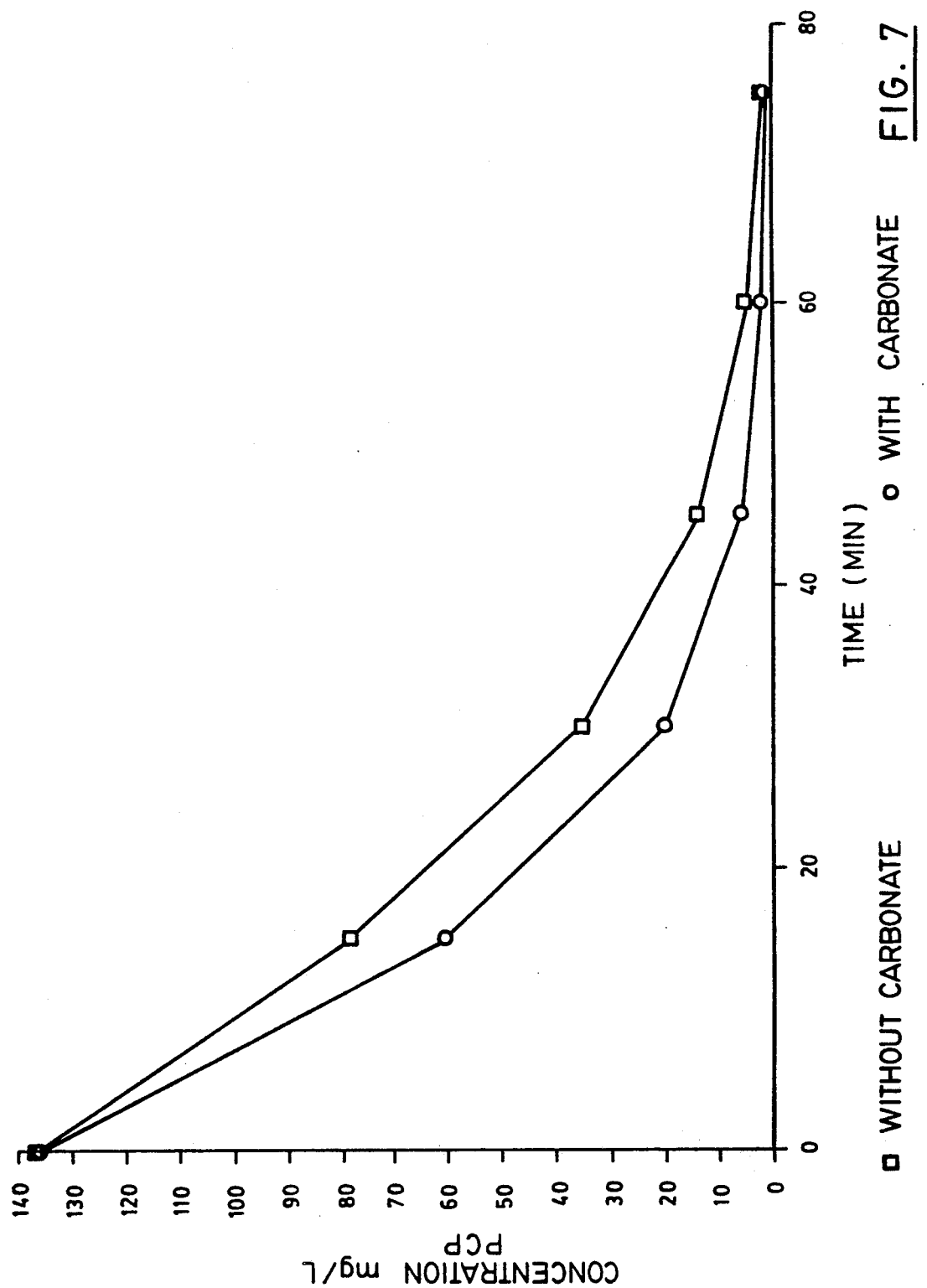

Three liters of water containing 137 ppm of pentachlorophenol were prepared. 300 mg/l of reagent grade sodium carbonate was added. The pH of the solution was 9. 100 ppm of $H_2O_2$ was added and ozone in a concentration of 18 mg/l in air was bubbled through at a rate of 0.35 liters of air per minute. The reaction was repeated except that sodium hydroxide and not sodium carbonate was used to bring the pH to 9. The results are contained in Table 4 and plotted in FIGS. 7 and 8.

TABLE 4

| Time (min) | With Carbonate addition Concentration (ppm) | $\ln\left(\frac{C}{Co}\right)$ | Without Carbonate addition Concentration (ppm) | $\ln\left(\frac{C}{Co}\right)$ |
|---|---|---|---|---|
| 0 | 136.4 | 0 | 137.1 | 0 |
| 15 | 60.6 | −.811 | 79.0 | −.551 |
| 30 | 19.8 | −1.93 | 35.4 | −1.35 |
| 45 | 5.96 | −3.13 | 14.2 | −2.27 |
| 60 | 1.96 | −4.24 | 4.87 | −3.34 |
| 75 | 0.81 | −5.13 | 1.69 | −4.40 |

We claim:

1. A process for treating an aqueous stream containing an organic oxidizable contaminant that does not have a substituent that is electron donating and at least one impurity selected from the group consisting of carbonate ion and bicarbonate ion comprising:
    adding a stochiometric excess amount of a precipitation agent to precipitate the impurity and to increase the pH of the stream to a basic level; and,
    subjecting the basic aqueous stream to an oxidation process to oxidize the oxidizable contaminant.
2. The process as claimed in claim 1 wherein the precipitation agent is a water soluble calcium salt.
3. The process as claimed in claim 1 wherein the precipitation agent is calcium hydroxide.
4. The process as claimed in claim 1 wherein the precipitation agent is lime.
5. The process as claimed in claim 4 wherein the oxidizable contaminant is selected from the group consisting of 2,4-dinitrotoluene, trinitrotoluene, 1,4-dioxane and ethylene glycol.
6. The process as claimed in claim 4 wherein the oxidizable contaminant is selected from the group consisting of 2,4-dinitrotoluene, 1,4-dioxane and ethylene glycol.
7. The process as claimed in claim 5 wherein the initial concentration of the oxidizable contaminant in the aqueous stream is less than 10,000 ppm.

8. The process as claimed in claim 6 wherein the initial concentration of the oxidizable contaminant in the aqueous stream is less than 1,000 ppm.

9. The process as claimed in claim 5 wherein the pH of the aqueous stream subsequent to the addition of the precipitation agent is at least 8.

10. The process as claimed in claim 5 wherein the pH of the aqueous stream subsequent to the addition of the precipitation agent is about 9.

11. The process as claimed in claim 1, 9 or 10 wherein the oxidation process is selected from the group consisting of the addition of ozone and hydrogen peroxide; the addition of ozone and irradiation with ultraviolet light with a substantial component having a wavelength between about 200 and about 300 nm; the addition of hydrogen peroxide and irradiation with ultraviolet light with a substantial component having a wavelength less than about 250 nm; the addition of ozone where the aqueous stream has a high pH; and, the addition of ozone and hydrogen peroxide and irradiation with ultraviolet light with a substantial component having a wavelength between about 180 and 300 nm.

12. The process as claimed in claim 1, 9 or 10 wherein the precipitated impurity is separated prior to the oxidation process.

13. A process for treating water containing a oxidizable contaminant selected from the group consisting of 2,4-dinitrotoluene, 1,4-dioxane and ethylene glycol and at least one impurity selected from the group consisting of carbonate ion and bicarbonate ion comprising:

adding a stochiometric excess amount of calcium hydroxide to precipitate the impurity and to increase the pH of the water to a basic level; and, subjecting the basic water to an oxidation process selected from the group consisting of the addition of ozone and hydrogen peroxide; the addition of ozone and irradiation with ultraviolet light with a substantial component having a wavelength between about 200 and about 300 nm; the addition of hydrogen peroxide and irradiation with ultraviolet light with a substantial component having a wavelength less than about 250 nm; the addition of ozone where the water has a high pH; and, the addition of ozone and hydrogen peroxide and irradiation with ultraviolet light with a substantial component having a wavelength between about 180 and 300 nm.

14. The process as claimed in claim 13 wherein subsequent to the addition of the precipitation agent, the water is subjected to solid/liquid separation to obtain a liquid phase which is subjected to the oxidation process.

15. The process as claimed in claim 14 wherein calcium hydroxide is added to the solution by the addition of lime.

* * * * *